United States Patent
Qu et al.

(10) Patent No.: US 9,468,981 B2
(45) Date of Patent: Oct. 18, 2016

(54) MICRO-DRILL AND METHOD FOR MANUFACTURING THE MICRO-DRILL

(71) Applicant: SHENZHEN JINZHOU PRECISION TECHNOLOGY CORP., Shenzhen (CN)

(72) Inventors: Jianguo Qu, Shenzhen (CN); Qiang Guo, Shenzhen (CN); Lei Wang, Shenzhen (CN)

(73) Assignee: SHENZHEN JINZHOU PRECISION TECHNOLOGY CORP., Shenzhen (CN)

( * ) Notice: Subject to any disclaimer, the term of this patent is extended or adjusted under 35 U.S.C. 154(b) by 63 days.

(21) Appl. No.: 14/411,945

(22) PCT Filed: Jul. 17, 2014

(86) PCT No.: PCT/CN2014/082374
§ 371 (c)(1),
(2) Date: Dec. 30, 2014

(87) PCT Pub. No.: WO2015/101015
PCT Pub. Date: Jul. 9, 2015

(65) Prior Publication Data
US 2015/0183031 A1 Jul. 2, 2015

(30) Foreign Application Priority Data
Dec. 31, 2013 (CN) .......................... 2013 1 0754599

(51) Int. Cl.
*B23B 51/02* (2006.01)
*B24B 3/24* (2006.01)

(52) U.S. Cl.
CPC ................. *B23B 51/02* (2013.01); *B24B 3/24* (2013.01); *B23B 2251/04* (2013.01);
(Continued)

(58) Field of Classification Search
CPC .................... Y10T 408/909; Y10T 408/9097; Y10T 408/9095; B23B 51/02; B23B 2251/04; B23B 2251/043; B23B 2251/046; B23B 2251/14; B23B 2251/287; B23B 2251/282; B23B 2251/28; B23B 2251/40; B23B 2251/408; B23B 2251/406; B23B 2251/426
See application file for complete search history.

(56) References Cited

U.S. PATENT DOCUMENTS 2,730,849 A * 1/1956 Novak ....................... B24B 3/28
451/375
2,912,887 A * 11/1959 Andreasson ............ B23B 51/06
408/230
4,826,368 A * 5/1989 Tikal ....................... B23B 51/02
408/225

(Continued)

FOREIGN PATENT DOCUMENTS

| CN | 102416494 A | 4/2012 |
|---|---|---|
| CN | 202861471 U | 4/2013 |
| CN | 102416494 B | 9/2013 |
| CN | 103752911 A | 4/2014 |
| DE | 102011001824 A1 | 10/2012 |

OTHER PUBLICATIONS

Sun Li, the International Searching Authority written comments, Oct. 2014, CN.

*Primary Examiner* — Daniel Howell
*Assistant Examiner* — Yasir Diab (57) ABSTRACT

A micro-drill includes a first rake face, a first rear face, a second rake face, a second rear face, a first spiral groove extending from a drill point to a tail of the drill, a second spiral groove symmetrically arranged about the first spiral groove, and a biasing groove arranged in front of the drill point. Where the first rake face, the first rear face, the second rake face, and the second rear face are arranged on the drill point. The first spiral groove and the first rake face intersect to form a first cutting edge, and the second spiral groove and the second rake face intersect to form a second cutting edge. The biasing groove and the second rake face intersect to make a length of the second cutting edge be less than a length of the first cutting edge, and the biasing groove and the second spiral groove intersect each other.

9 Claims, 6 Drawing Sheets

(52) U.S. Cl.
CPC ... *B23B 2251/043* (2013.01); *B23B 2251/046* (2013.01); *B23B 2251/14* (2013.01); *B23B 2251/28* (2013.01); *B23B 2251/282* (2013.01); *B23B 2251/287* (2013.01); *B23B 2251/40* (2013.01); *B23B 2251/408* (2013.01); *B23B 2251/426* (2013.01); *Y10T 408/909* (2015.01); *Y10T 408/9095* (2015.01); *Y10T 408/9097* (2015.01)

(56) References Cited

U.S. PATENT DOCUMENTS

| | | | | |
|---|---|---|---|---|
| 5,231,802 | A | * | 8/1993 | Hosoi ................. B23B 51/02 408/230 |
| 6,988,859 | B2 | * | 1/2006 | Borschert ........... B23B 51/02 408/230 |

* cited by examiner

MICRO-DRILL AND METHOD FOR MANUFACTURING THE MICRO-DRILL

TECHNICAL FIELD

The present disclosure relates to the field of micro-cutting tools, and more particularly to a micro-drill and a method of manufacturing the micro-drill.

BACKGROUND

Micropores are important elements of a printed circuit board (PCB), where micropore electroplating plays a role in electrical interconnection and in supporting components in the PCB. The micropores can be divided into two types: through hole and blind hole (counter bore is regarded as one of the through holes). The blind hole is mainly used for high density interconnector (HDI) PCBs, and the through hole is mainly used for single-sided boards, double-sided boards, multilayer boards, flexible printed circuit boards (FPCs), and printed circuit board assemblies (PCBAs). In recent years, PCBAs have rapidly developed and are widely used because of multi-pins, small product packaging area, good electrical and heat dissipation properties, high density, and so on. Development of flip (FC) package substrate is rapid, and high-level of multi chip model (MCM) and system in a package (SIP) are widely used in chip scale package (CSP) substrates. This is especially true in smart phones and tablet computers produced by APPLE and SAMSUNG where package substrates are used because the package substrates are widely sold in consumer electronics. Fierce competition exists in main countries and regions that produce the PCBA for high-density multilayer substrate technology and in decreasing costs of manufacturing the package substrate. In integrated chip (IC) packaging, high-density multilayer substrate technology is widely used. Cost of a ball grid array (BGA) package substrate is about 40% to 50% of total cost, and cost of FC package substrate is about 70% to 80% of the total cost. Package substrate has become one of important "weapons" of the country or the region in the development of microelectronics industry.

Compared with ordinary plate materials, in mechanical drilling, the PCBA requires subtle aperture, high-density of bore, high-precision hole site, and multi-layer plate, which affects the drilling as follows:
a) overheating the drill point because of poor exhaustion of dust, and easy damage of a cutter; and
b) poor precision of hole sites.

In patent Chinese application No. ZL200510105356, a drill structure includes a first spiral groove and a second spiral groove, where the first spiral groove and the second spiral groove are asymmetrically positioned with respect to a drill rotational center (an angle defined by the two spiral grooves relative to the drill rotational center is set to be 40° or more and less than 180°). A land portion behind the first spiral groove is larger than a land portion behind the second spiral groove, and the second spiral groove is a blind channel, namely the second spiral groove does not extend to a tail of the drill.

The above-mentioned drill has two defects: 1) the first spiral groove and the second spiral groove are asymmetrically positioned with respect to the drill rotational center, which makes a centroid of a drill point excessively deviate an axis of the drill Thus, when the drill rapidly rotates in the machine tool, the drill may exhibit excessive movement, which further affects precision of hole site. 2) The land portion behind the first spiral groove is larger than the land portion behind the second spiral groove, and the second spiral groove is the blind channel, which makes debris be easily collected in the blind channel, thereby causing dry friction between the debris and wall of the hole to generate heat. When excessive debris is discharged by the first spiral groove, air suction of the drill used to remove the debris, exhibits loss of power in the first spiral groove, thereby affecting heat dissipation of the drill point.

SUMMARY

The aim of the present disclosure is to provide a micro-drill and a method for manufacturing the micro-drill capable of good dust-exhaustion and high precision of hole site.

The aim of the present disclosure is achieved by the following methods.

A micro-drill comprises a first rake face, a first rear face, a second rake face, a second rear face, a first spiral groove extending from a drill point to tail of the drill, a second spiral groove symmetrically arranged about the first spiral groove, and a biasing groove arranged in front of the drill point. Where the first rake face, the first rear face, the second rake face, and the second rear face are arranged on the drill point. The first spiral groove and the first rake face intersect to form a first cutting edge, and the second spiral groove and the second rake face intersect to form a second cutting edge. The biasing groove and the second rake face intersect to make a length of the second cutting edge be less than a length of the first cutting edge, and the biasing groove and the second spiral groove intersect each other.

Furthermore, the biasing groove and the second rear face intersect to make a length of intersection between the second rear face and drill body be less than a width of cutter, thereby further enlarging area and space of the biasing groove, and improving the efficiency of heat dissipation and the air-pumping efficiency of the dust-separation equipment.

Furthermore, the length of intersection between the second rear face and the drill body is greater than or equal to zero. When the length of intersection between the second rear face and the drill body is equal to zero, the biasing groove and the first spiral groove intersect each other, thus, the dust-separation equipment can pump the air in the first spiral groove, and hot air can be rapidly pumped, thereby improving the efficiency of heat dissipation. It should be understood that, according to drill model, on a premise of ensuring strength of the drill point, the length of intersection between the second rear face and the drill body can be accordingly adjusted, which avoids strength reduction of the drill point.

Furthermore, the length of the second cutting edge is greater than or equal to zero. When the length of the second cutting edge is equal to zero, the second cutting edge completely loses debris capacity, thus, efficiency of pumping the air through the second spiral groove is best, and efficiency of heat dissipation is improved.

Furthermore, the biasing groove extends from an outside of the second spiral groove to an inside of the second spiral groove, a width of intersection between the biasing groove and the second spiral groove is less than a width of the second spiral groove, and a depth of the biasing groove is greater than a depth of the second spiral groove. Thus, the dust-separation equipment can rapidly pump the air in the drill point, thereby improving the efficiency of heat dissipation.

Furthermore, a width of the biasing groove is greater than a width of the second spiral groove, and covers the second spiral groove. Thus, the dust-separation equipment can further rapidly pump the air in the drill point, and the efficiency of heat dissipation is improved.

Furthermore, an angle α defined by an edge of the biasing groove and an edge of the second spiral groove is set to be greater than 90° and less than or equal to 180°.

Furthermore, helix angle of the biasing groove is same as helix angle of the second spiral groove. According to strength requirement of the drill body, the structure of the drill of the example can ensure that thickness of drill core in the drill point is same.

Furthermore, helix angle of the biasing groove is different from helix angle of the second spiral groove. Different processing requirements demand different drill strength and hole site precision, when the drill strength is ensured, the drill of the example can satisfy cuffing precision according to different hole site precision.

A method for manufacturing the above-mentioned micro-drill, comprises:

S1: grinding out a drill point, the first spiral groove, and the second spiral groove; and S2: grinding out a biasing groove.

In the present disclosure, the biasing groove is arranged in front of the drill point. The biasing groove and the second rake face intersect to make the length of the second cutting edge be less than the length of the first cuffing edge, and the biasing groove and the second spiral groove intersect each other. When the length of the second cuffing edge is less than the length of the first cuffing edge, debris capacity of the second cuffing edge is reduced and even lost, which makes cuttings in the second spiral groove reduce and even fade away. Thus, the dust-separation equipment can rapidly pump air in the drill point of the second spiral groove, thereby improving efficiency of heat dissipation. The biasing groove is simultaneously regarded the big radiating surface, which increases efficiency of heat exchange between the drill point and the air. When the dust-separation equipment rapidly pumps the air in the drill point of the second spiral groove, the biasing groove further improves efficiency of heat dissipation.

DETAILED DESCRIPTION

Some examples of a micro-drill of the present disclosure are shown in FIG. 1-FIG. 10, where the micro-drill comprises a first rake face 111, a first rear face 112, a second rake face 121, a second rear face 122, a first spiral groove 10 extending from a drill point to a tail of the drill, a second spiral groove 20 symmetrically arranged about the first spiral groove 10 and a biasing groove 30 arranged in front of the drill point. Where the first rake face 111, the first rear face 112, the second rake face 121, and the second rear face 122 are arranged on the drill point. The first spiral groove 10 and the first rake face 111 intersect to form a first cutting edge 110, and the second spiral groove 20 and the second rake face 121 intersect to form a second cutting edge 120. The biasing groove 30 and the second rake face 121 intersect to make a length of the second cutting edge 120 be less than a length of the first cutting edge 110, and the biasing groove 30 and the second spiral groove 20 intersect each other. When the length of the second cutting edge 120 is less than the length of the first cutting edge 110, a debris capacity of the second cutting edge 120 is reduced and even lost, which makes cuttings in the second spiral groove 20 reduce and even fade away. Thus, a dust-separation equipment can rapidly pump air in the drill point of the second spiral groove, thereby improving efficiency of heat dissipation. The biasing groove 30 is simultaneously regarded a big radiating surface, which increases efficiency of heat exchange between the drill point and the air. When the dust-separation equipment rapidly pumps the air in the drill point of the second spiral groove, the biasing groove further improves efficiency of heat dissipation.

The present disclosure also provides a method for manufacturing the above-mentioned drill, and the method comprises:

S1: grinding out the drill point, the first spiral groove, and the second spiral groove according to structure of a typical drill, where the drill point comprises the first rake face 111, the first rear face 112, the second rake face 121, and the second rear face 122; and S2: grinding out the biasing groove after accomplishing the step S1.

The present disclosure will further be described in detail in accordance with the figures and the exemplary examples.

Example 1

Figure 1:
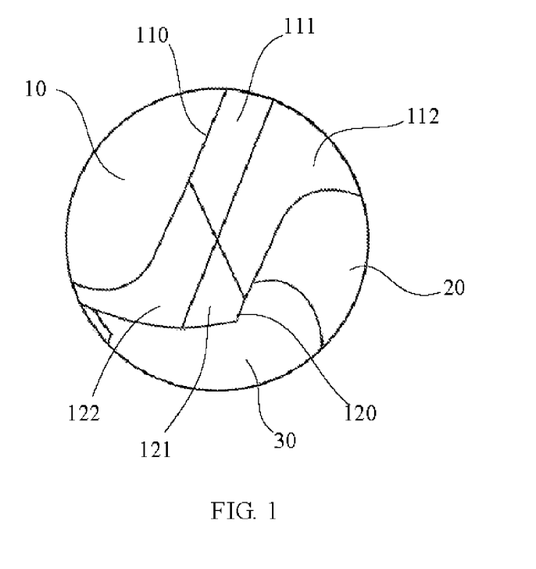
FIG. 1 is a structural diagram of a drill point of a first example of the present disclosure.
Figure 2:
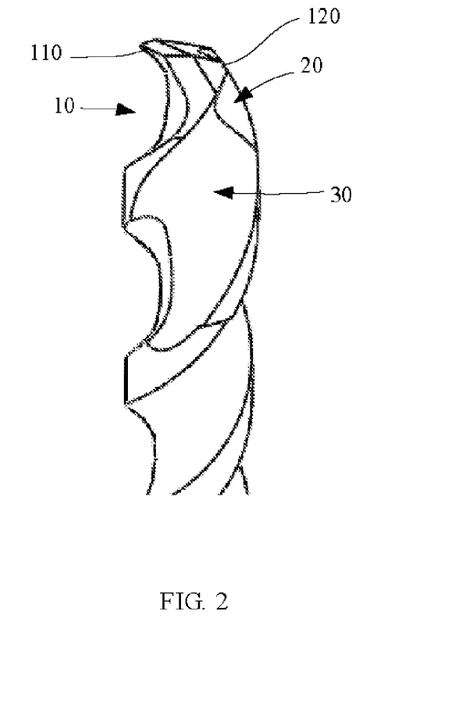
FIG. 2 is a structural diagram of a front end of a drill body of the first example of the present disclosure.
Figure 3:
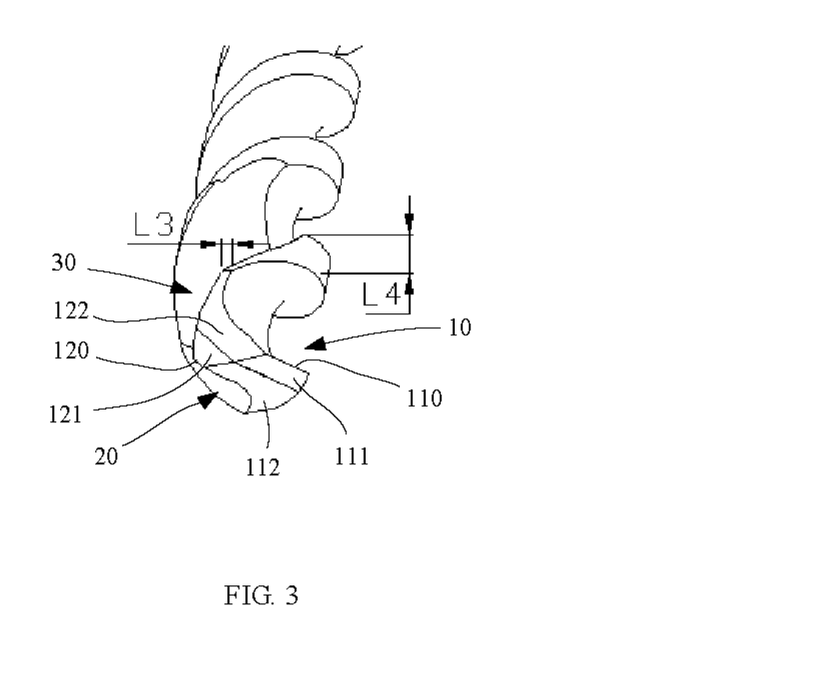
FIG. 3 is a structural diagram of the front end of the drill body of the first example of the present disclosure.

As shown in FIG. 1-FIG. 3, the micro-drill comprises the first rake face 111, the first rear face 112, the second rake face 121, the second rear face 122, the first spiral groove 10 extending from the drill point to the tail of the drill, the second spiral groove 20 symmetrically arranged around the first spiral groove, and the biasing groove 30 arranged in front of the drill point. The first spiral groove 10 and the first rake face 111 intersect to form the first cuffing edge 110, and the second spiral groove 20 and the second rake face 121 intersect to form the second cuffing edge 120. The biasing groove 30 and the second rake face 121 intersect to make length of the second cuffing edge 120 be less than length of the first cuffing edge 110, and the biasing groove 30 and the second spiral groove 20 intersect each other. A depth of the biasing groove 30 is greater than a depth of the second spiral groove 20, which enlarges space of the biasing groove at the drill, thereby improving efficiency of dust removal, and accelerating to discharge air in the drill point.

As shown in FIG. 3, in the example, the biasing groove 30 and the second rear face 122 also intersect each other. Thus, length L3 of intersection between the second rear face 122 and the drill body is less than width L4 of a cutter, thereby further enlarging area and space of the biasing groove, and improving heat dissipation efficiency and the air-pumping efficiency of dust removal equipment. In the example, the length L3 of intersection between the second rear face 122 and the drill body is greater than zero, and is determined according to a drill model. On a premise of ensuring strength of the drill point, the length L3 of intersection between the second rear face 122 and the drill body can be accordingly adjusted, which avoids strength reduction of the drill point.

In the present example, a length of the second cutting edge 120 is very small, and the second cutting edge 120 has a reduced debris capacity, thus, resistance of the dust-separation equipment against pumping the air is reduced, thereby improving the air-pumping efficiency, and accordingly improving the heat dissipation efficiency.

Figure 4:
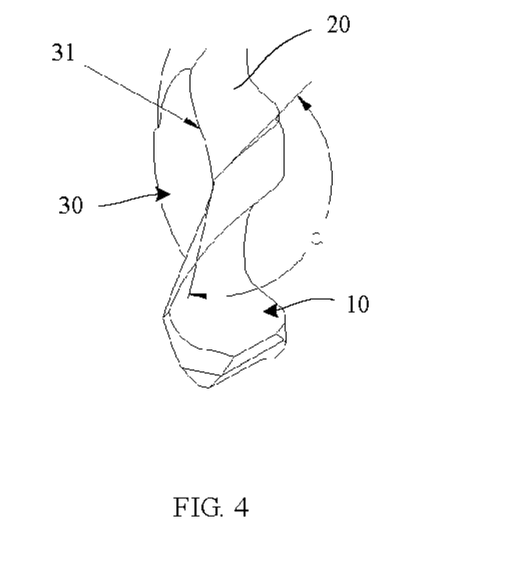
FIG. 4 is a structural diagram of the front end of the drill body of the first example of the present disclosure.
Figure 5:
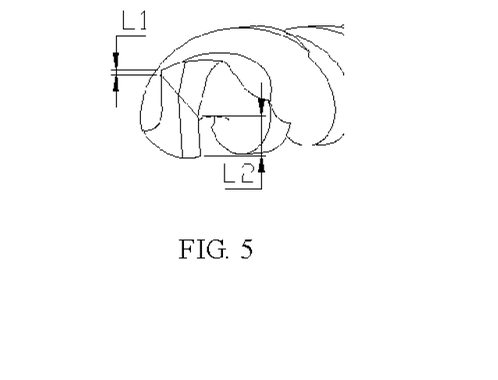
FIG. 5 is a structural diagram of the front end of the drill body of the first example of the present disclosure.

As shown in FIG. 4, in the example, an angle α defined by an edge of the biasing groove 30 and an edge of the second spiral groove 20 is set to be greater than 90° and less than or equal to 180°.

In the example, the length of the second cuffing edge 120 is greater than or equal to zero. When the length of the second cutting edge 120 is equal to zero, the second cuffing edge 120 completely loses debris capacity, thus, efficiency of pumping the air through the second spiral groove is best, and efficiency of heat dissipation is improved.

Example 2

Figure 6:
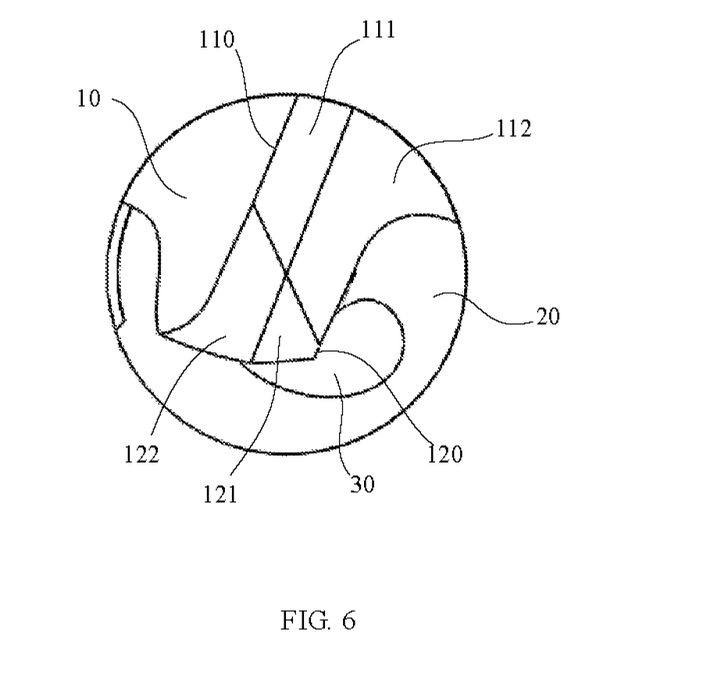
FIG. 6 is a structural diagram of a drill point of a second example of the present disclosure.
Figure 7:
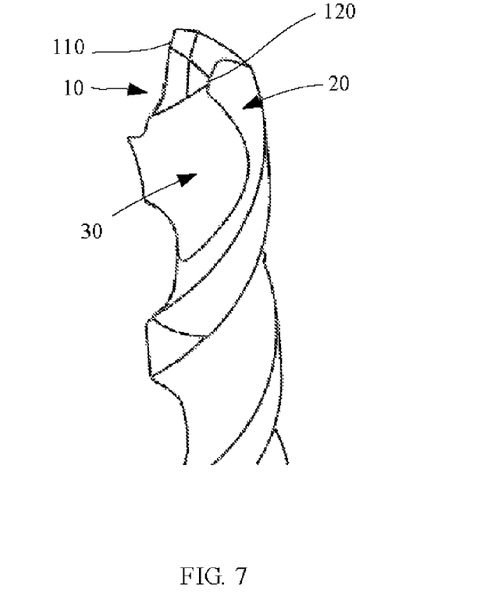
FIG. 7 is a structural diagram of a front end of a drill body of the second example of the present disclosure.

As shown in FIG. 6 and FIG. 7, some differences exist between the first example and the second example. In the second example, the length of intersection between the second rear face 122 and the drill body is less than zero, which causes intersection between the biasing groove 30 and the first spiral groove 10. Thus, the dust-separation equipment can pump the air in the first spiral groove 10, and hot air can be rapidly pumped by the dust-separation equipment, thereby improving heat dissipation efficiency.

In design of the second example, helix angle of the biasing groove 30 is different from helix angle of the second spiral groove. Different processing requirements demand different drill strengths and hole site precision, thus, the helix angle of the biasing groove 30 can be chosen according to different requirements.

Example 3

Figure 8:
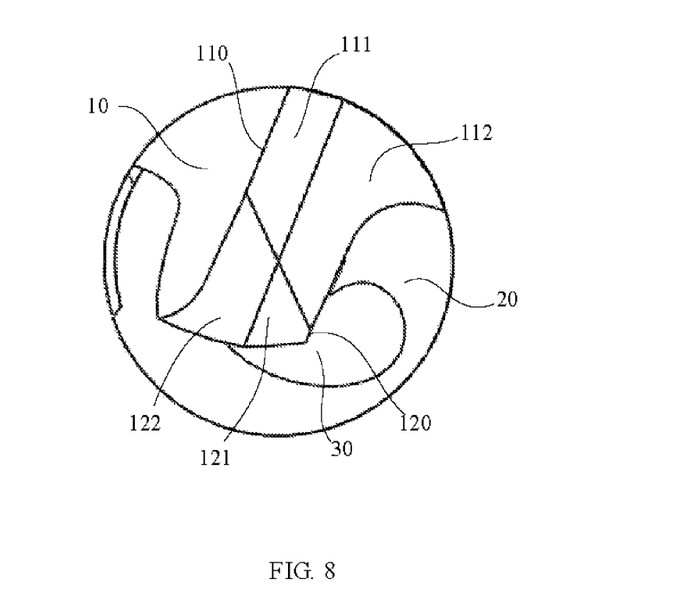
FIG. 8 is a structural diagram of a drill point of a third example of the present disclosure.
Figure 9:
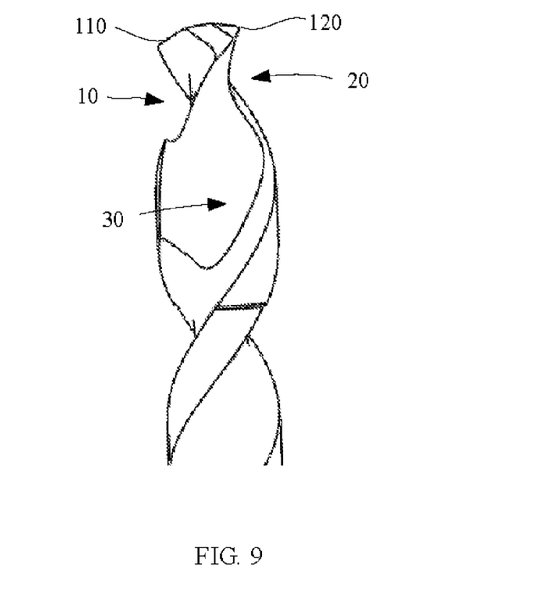
FIG. 9 is a structural diagram of a front end of a drill body of the third example of the present disclosure.

As shown in FIG. 8 and FIG. 9, some differences exist between the second example and the third example. In the third example, the first spiral groove 10 and the second spiral groove 20 are symmetrically arranged, and the biasing groove 30 extends from an outside of the second spiral groove to an inside of the second spiral groove. The width of intersection between the biasing groove 30 and the second spiral groove 20 is less than the width of the second spiral groove 20, and the depth of the biasing groove 30 is greater than the depth of the second spiral groove 20. Thus, the dust-separation equipment can rapidly pump air in the drill point, thereby further improving heat dissipation efficiency. The helix angle of the biasing groove 30 is same as the helix angle of the second spiral groove 20, according to strength requirement of the drill body. The structure of the drill of the example can ensure that drill core in the drill point having a consistent thickness, thus, strength of the drill point is improved.

Example 4

Figure 10:
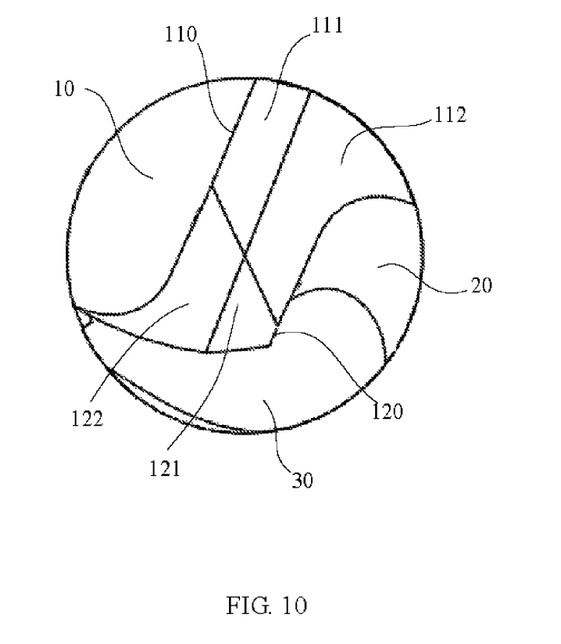
FIG. 10 is a structural diagram of a drill point of a fourth example of the present disclosure.
Figure 11:
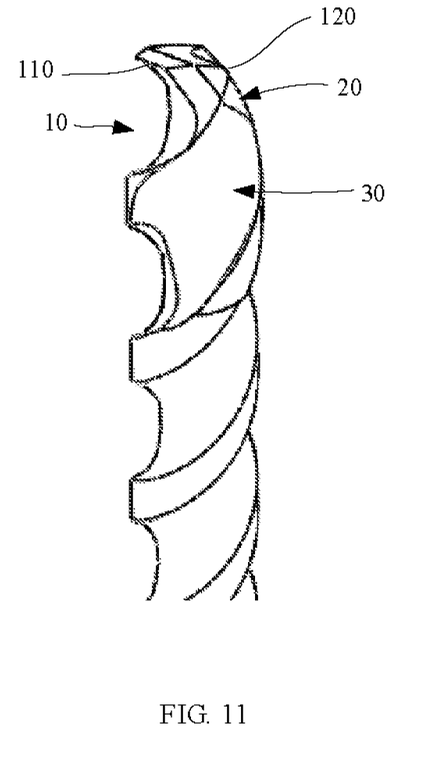
FIG. 11 is a structural diagram of a front end of a drill body of the fourth example of the present disclosure.

As shown in FIG. 10 and FIG. 11, in the example, the length of intersection between the second rear face 122 and the drill body is very small, and is close to zero, thus, the area and the space of the biasing groove 30 are increased, and the radiating surface and air pumping air efficiency are improved. In the example, the width of the biasing groove 30 is greater than the width of the second spiral groove 20, and covers the second spiral groove 20.

The present disclosure is described in detail in accordance with the above contents with the specific exemplary examples. However, this present disclosure is not limited to the specific examples. For the ordinary technical personnel of the technical field of the present disclosure, on the premise of keeping the conception of, the technical personnel can also make simple deductions or replacements, and all of which should be considered to belong to the protection scope of the present disclosure.

We claim:

1. A micro-drill, comprising:
   a first rake face;
   a first rear face;
   a second rake face;
   a second rear face;
   a first spiral groove extending from a drill point to a tail of the drill;
   a second spiral groove symmetrically arranged around the first spiral groove; and
   a biasing groove arranged in front of the drill point;
   wherein the first rake face, the first rear face, the second rake face, and the second rear face are arranged on the drill point; the first spiral groove and the first rake face intersect to form a first cutting edge, and the second spiral groove and the second rake face intersect to form a second cutting edge; the biasing groove and the second rake face intersect to make a length of the second cutting edge be less than a length of the first cutting edge, and the biasing groove and the second spiral groove intersect each other.

2. The micro-drill of claim 1, wherein the biasing groove and the second rear face intersect to make a length of inter-section between the second rear face and drill body be less than a width of a cutter.

3. The micro-drill of claim 2, wherein the length of inter-section between the second rear face and the drill body is greater than or equal to zero.

4. The micro-drill of claim 1, wherein the length of the second cutting edge is greater than or equal to zero.

5. The micro-drill of claim 1, wherein the biasing groove extends from an outside of the second spiral groove to an inside of the second spiral groove; a width of intersection between the biasing groove and the second spiral groove is less than a width of the second spiral groove, and a depth of the biasing groove is greater than a depth of the second spiral groove.

6. The micro-drill of claim 1, wherein a width of the biasing groove is greater than a width of the second spiral groove, and covers the second spiral groove.

7. The micro-drill of claim 1, wherein an angle a defined by an edge of the biasing groove and an edge of the second spiral groove is greater than 90° and less than or equal to 180°.

8. The micro-drill of claim 1, wherein helix angle of the biasing groove is same as helix angle of the second spiral groove.

9. The micro-drill of claim 1, wherein helix angle of the biasing groove is different from helix angle of the second spiral groove.

* * * * *